Figure 1:
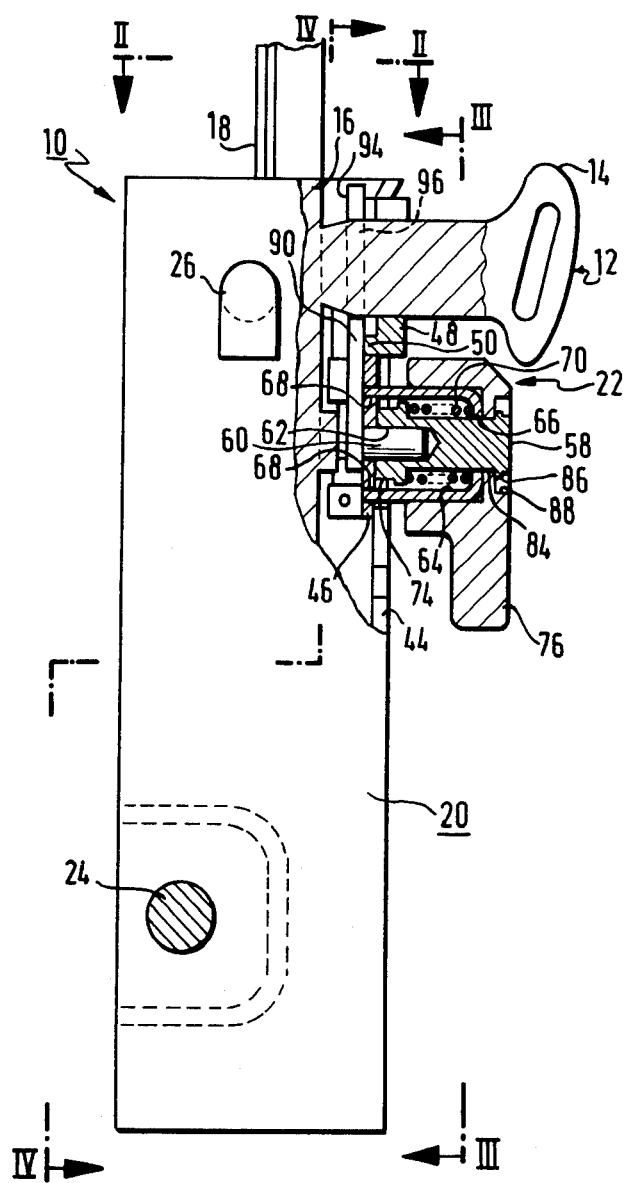

United States Patent [19]

Forkel Michael et al.

[11] 4,456,283
[45] Jun. 26, 1984

[54] POSITIONALLY ADJUSTABLE HOLDING DEVICE FOR AN ENGAGING MEMBER OF A SAFETY BELT

[75] Inventors: Forkel Michael, Coburg; Hans-Joachim Volk, Ebersdorf, both of Fed. Rep. of Germany

[73] Assignee: Metallwerk Max Brose GmbH & Co., Coburg, Fed. Rep. of Germany

[21] Appl. No.: 260,425

[22] Filed: May 4, 1981

[30] Foreign Application Priority Data

May 13, 1980 [DE] Fed. Rep. of Germany ....... 3018309

[51] Int. Cl.³ .................................... B60R 21/10
[52] U.S. Cl. .................................... 280/804; 297/483
[58] Field of Search ............... 280/801, 802, 803, 804, 280/805, 806, 808; 297/469, 483

[56] References Cited

U.S. PATENT DOCUMENTS 4,039,224 8/1977 Bauer et al. ..................... 280/804
4,230,432 10/1980 Howell ............................. 410/81

FOREIGN PATENT DOCUMENTS 2815918 10/1979 Fed. Rep. of Germany .

Primary Examiner—Richard A. Bertsch
Attorney, Agent, or Firm—Toren, McGeady and Stanger

[57] ABSTRACT

A positionally adjustable holding device for an engaging member of a safety belt includes a holding track with an elongated slot formed in one wall of the track. Outwardly extending bulges are located at spaced locations along the slot. An engaging member is arranged to be connected to one end of the safety belt and a sliding member is coupled to the engaging member. The sliding member includes a retractable locking pin which is selectively engageable in the bulges or recesses in the slot.

16 Claims, 4 Drawing Figures

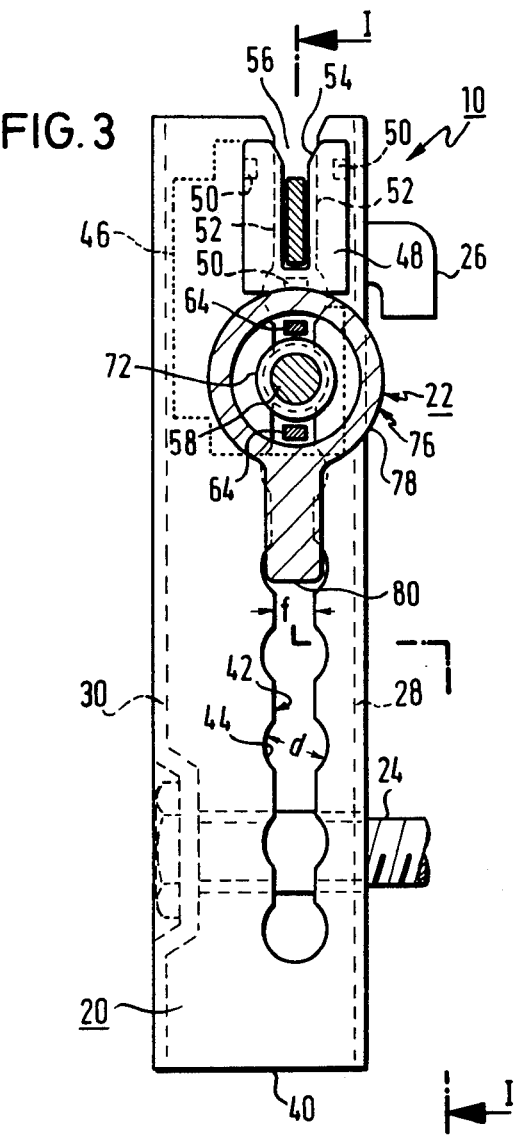

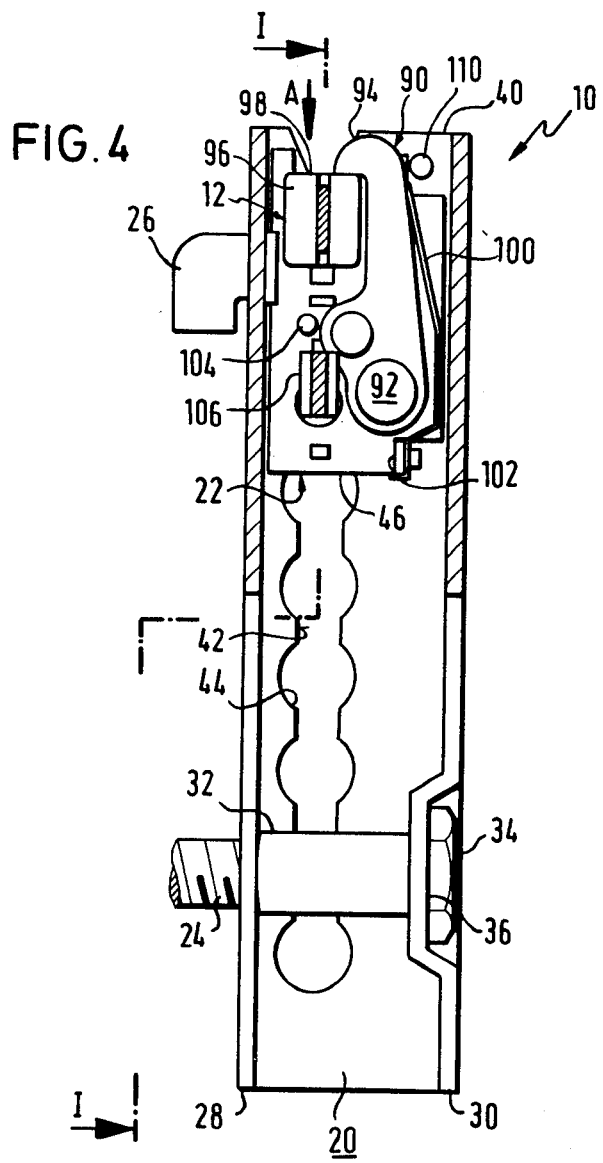

POSITIONALLY ADJUSTABLE HOLDING DEVICE FOR AN ENGAGING MEMBER OF A SAFETY BELT

The present invention is directed to a positionably adjustable holding device for an engaging member of a safety belt.

The invention relates to a further development of the subject matter of the U.S. patent application No. 190,729, now U.S. Pat. No. 4,354,696. The subject matter of the cited patent application is, among other things, a locking device for the engaging member of a safety belt of a passive safety belt actuation device, wherein the locking device for the engaging member is rigidly affixed to a vehicle frame. With that, there is also established the so-called belt articulation point, that is to say, the end point of a safety belt or, if such is the case, the deflection point of a three-point-safety belt. In order to offer the greatest amount of protection during an accident, the belt guidance of a safety belt must be adapted as substantially as possible to the vehicle user who is to be protected; it is thus of great significance that the upper belt articulation point be adapted in its height adjustment to the body size of the vehicle user. By the introduction of the positional adjustability of the belt articulation point there is an improvement, similarly as by means of the measures suggested in the U.S. patent application No. 190,729, in the accident safety and the functional safety of the safety belt actuating device. The problem of the height adjustability of the belt articulation point is posed, however, not only specifically in passive safety belt actuating devices, but rather in safety belts in general.

From the DE-OS No. 28 15 918, there is known a positionally adjustable holding device for an engaging member of a safety belt, comprising a holding track with a slot along which the engaging member is movable and catchable in catch positions. From the vertically extending slot there emanate at varying heights several side slots extending slantedly downwards and bent off downwards at their end. The crossbolt-shaped engaging member is freely movable along the slot as well as in the side slots. In order to adjust a certain height, the engaging member is moved in one of the side slots and let go there. Under the force of gravity, the engaging member remains in the bottommost position, the catch position, inside the side slot. If, however, other forces additionally act on the engaging member, such as, for example, strong vibrations of the vehicle during a drive and with a loose belt, then it cannot be ruled out that the engaging member can move into another side slot, that is to say into another catch position. It can also not be ruled out that because of a mistake in the operation or when the belt gets caught somewhere, pull forces act on the engaging member and move it out of the side slot.

To counter this, it is the task of the invention to improve a positionally adjustable securing device for an engaging member of a safety belt comprising a holding track with a slot along which the engaging member is movable and catchable in catch position, to such an extent that the engaging member is securely locked in the catch position.

This task is solved by means of a catchable sliding member which is couplable with the engaging member and mounted at the holding track, said sliding member, when released, being movable along the slot and, when caught, force-lockingly engaging with a retractable locking pin in one of many recesses of the holding track which determine the catch positions. In the catch position with the locking pin pushed in, the sliding member which is coupled with the engaging member is connected with the holding track in such a way that it cannot be moved. It is therefore ruled out that the engaging member unintentionally shifts. This locking catch is achieved with simple constructional means.

It is suggested that the recesses be formed by preferably arc-shaped bulges of the slot. By this means, the measurements of the holding track can be kept small, since there are not to be provided any additional recesses next to the slots.

A simple bearing of the locking pin is guaranteed by a substantially U-shaped clamp attached at both ends to the sliding member and arranged along the slot and going through it, the locking pin being mounted at the middle part of said clamp in such a way as to be axially movable. Thereat, the locking pin can be mounted at one of its ends in a bearing opening of the clamp and at its other end on a bearing pin attached to the sliding member, said bearing pin engaging into a central bore of the locking pin. This kind of bearing is simple yet mechanically stable.

The locking pin is reliably held in the engagement position with the recesses and, yet, is quickly and easily retractable for adjusting the engaging member if, as suggested, the locking pin is biased by spring means in the engagement position with the recesses. For this there is preferably used a coil or helical compression spring which is propped on one hand against the clamp in the area of the bearing opening, and on the other hand against a collar constructed at the other end of the locking pin.

The manipulation of the locking pin by hand is facilitated if the one end of the locking pin which protrudes from the bearing opening of the clamp is provided with a manipulation handle.

It is suggested that the sliding member comprise a bearing plate, which is parallel to the plane of the slot, and a sliding-and-guidance piece inserted in the slot. Such a sliding member can be fabricated cost-effectively; the bearing plate is preferably a sheet metal part and, the sliding-and-guidance piece is a plastic part.

The holding device can, with simple construction, withstand very high pull forces, if the bearing plate is arranged on the side of the holding track facing away from the safety belt, in the area of the slot. The bearing plate is then held tight by the slot rims of the holding track.

The holding track is sturdy at low weight, if, as suggested, it is constructed as a U-section bar.

The positional adjustability of a safety belt according to the invention is also advantageous in the passive safety belt actuation device mentioned in the introduction. For this, it is suggested that the sliding member be connected with the locking device. The locking device and thus the belt articulation point can, when the engaging member is locked, be moved into different catch positions by accordingly displacing the sliding member; the automatic locking and unlocking of the engaging member in the locking device is not hindered by this measure.

A particularly simple construction is obtained then, when the catch lever of the locking device is mounted, as per the U.S. patent application No. 190,729, at the sliding member, preferably at the bearing plate.

A compact, closed arrangement is obtained thereby that there is arranged, at the side of the holding track facing away from the safety belt, a power transmission member of the passive safety belt actuation device, said member supporting the engaging member; that the bearing plate is arranged between the power transmission member and the holding track; and that the engaging member in the locked position traverses the one-sidedly open slot of the holding track as well as a one-sidedly open receiving slot of the bearing plate.

In order to prevent a sliding-out of the sliding member, from the one-sidedly open slot, it is suggested to provide a sliding member stop at the holding track.

Reference is made to the description as well as the figures of U.S. patent application No. 190,729 as possibly necessary additional elucidation of the invention.

Below, the invention is elucidated on the basis of an embodiment example, with the help of the drawings.

There is shown, in

Figure 2:
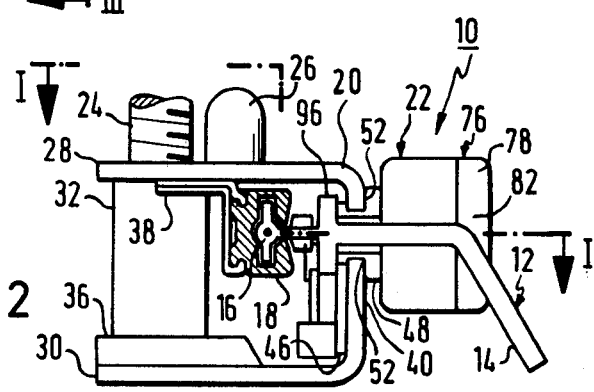

FIG. 1, a lateral view of a positionally adjustable holding device in a section along the line I—I in FIGS. 2–4;

FIG. 2, a top view of the holding device in a section along the line II—II in FIG. 1;

FIG. 3, a frontal view of the holding device in a section along the line III—III in FIG. 1;

FIG. 4, a back view of the holding device along the line IV—IV in FIG. 1.

The positionally adjustable holding device shown in FIGS. 1 to 4 is designated overall with 10. It serves to secure an engaging member 12 which, via a belt loop 14, leads along with itself the end of a not-represented safety belt. The engaging member 12 projects at a right angle from a power transmission member 16 which is unyielding to tension and compression and which is led inside a guide section 18 (see FIG. 2) and is movable back and forth by means of a not-represented drive.

The holding device 10 consists of a housing-like holding track 20 constructed as a U-section bar and of a sliding member 22 movable at the holding track. The holding track is rigidly affixed to a not-represented vehicle frame, and this by means of a fastening bolt 24 and a sidewardly projecting hook 26. The fastening bolt 24 extends transversely to the longitudinal direction of the holding track 20 and thereat traverses the two side walls 28 and 30 of the holding track 20. In order to prevent a bending of the holding track 20 when the fastening bolt 24 is tightened, and in order to increase the mechanical stability of the holding track 20, there is fitted between the sidewalls 28 and 30 a spacer tube 32 which surrounds the fastening bolt 24. The right-hand side wall 30 in FIG. 4 is provided with a depression 36 for the head 34 of the fastening bolt 24, said depression being fabricated by means of a suitable impression in the holding track 20 which consists of sheet metal. At the side wall 28 there is welded on or riveted on a holding angle 38 for the guide section 18 (see FIG. 2). In FIGS. 3 and 4, the guide section 18 was left out for the sake of simplicity.

In the base wall 40 of the holding track 20, which base wall connects the side walls 28 and 30, there is worked in a slot 42, which has a series of arc-shaped bulges 44. This slot 42 can be fabricated for example thereby that there are first bored a plurality of circular bores at a distance from one another in a straight row parallel to the longitudinal direction of the holding track 20, and that following that, there is cut a longitudinal slot with parallel sides along the connecting line of the centers of the circles.

The sliding member 22 which is movable along the slot 42 consists of a bearing plate 46 at the undersides of which—said undersides being recognizable in FIG. 4—there are affixed parts which serve for the locking of the engaging member 12 and at the top side of which there are affixed parts which serve to catch the sliding member 22 at the holding track 20, as is described below. The bearing plate 46 is affixed at the inner side of the base wall 40 facing the guide section 18. In FIG. 3 its outline is indicated with dots.

A sliding-and-guide piece 48 holds the bearing plate 46 to the base wall 40 of the holding track 20. For attachment to the bearing plate 48, the sliding-and-guide piece 46 grips with three attachment protuberances 50 into corresponding holes of the bearing plate 46. In FIG. 1, one of the protuberances 50 is recognizable in section; in FIG. 3 the attachment protuberances are indicated in dash-dots. As can be seen in FIGS. 2 and 3, the sliding-and-guide piece 48 is provided with sideward guide grooves 52, into which the slot rims of the base wall 40 engage. Thus, the bearing plate 46 is movably attached at the holding track 20 in the direction of the slot 42. There is formed in the sliding member 22 (that is to say in the bearing plate 46 and in the sliding-and-guide piece 48) a receiving slot 54 open at the top in FIG. 3, for receiving the engaging member 12. In the area of the aperture of the receiving slot 54 there are affixed at the bearing plate 46, as well as at the sliding-and-guide piece 48, guiding surfaces 56 which facilitate the insertion of the engaging member 12.

A retractable locking pin 58 of the sliding member 22 serves for catching at the holding track 20. It projects at a right angle from the bearing plate 46 in the direction away from the guide section 18. The end of the locking pin 58 near the bearing plate is mounted so as to be axially movable on a bearing bolt 60 attached at the bearing plate 46 and engaging in a central bore 62 of the locking pin 58. The other end of the locking pin 58 is also axially movably mounted in a bearing opening 66 of a clamp 64. The clamp 64 is substantially U-shaped and fitted at both ends into corresponding holding holes 68 of the bearing plate 46 for attachment at the bearing plate 46 (FIG. 1). In FIG. 3, the sides of the clamp 64 are recognizable in section. These, then are arranged in the direction of the slot 42 which they also extend through.

A helical compression spring 70 recognizable in FIG. 1 and left out in FIG. 3 entwines the locking pin 58 and biases it in the direction towards the bearing plate 46. Thereat, it is propped on one hand against the inner side of the clamp 64 in the area of the bearing opening 66 and, on the other hand, against a collar 72 which is formed at the end of the locking pin 58 near the bearing plate.

Adjacent to the collar 72, and protruding beyond the base wall 40, there is connected a cylindrical end area 74, the circumference line of which is indicated with a broken line in FIG. 3. The diameter of the end area 74 is made to coincide with the diameter d of the circular bulges 44 of the slot 42. In the catch position represented in FIGS. 1 to 4, the locking pin 58 engages form-lockingly and thus force-lockingly with this end area 74 in one of the recesses 44. It is of course prerequisite that the slot width f of the slot parts with parallel sides, which slot parts connect the circular bulges 44, be smaller than the diameter d of the bulges 44. It has proven to be favorable if d is approximately twice as large as f.

In order to detach the catch of the locking pin 58 in a recess 44, the locking pin is brought out of engagement with the recess 44, that is to say it is moved away from the bearing plate 46 by at least the thickness of the base wall 40. This is facilitated by means of a manipulation handle 76 affixed at the end of the locking pin away from the bearing plate. This handle consists of a base body 78 enveloping the clamp 64 and a radially projecting protuberance 80. At the side opposite the protuberance 80, the base body 78 is provided with a bevel 82 to avoid collisions with the belt loop 14. The locking pin 58 extends through a receiving opening 84 of the manipulation handle 76 and prevents the pulling-off of the manipulation handle 76 from the locking pin 58 with a collar 86 of increased diameter adjacent to the opening 84. The end of the locking pin 58 having the collar 86 is situated in a depression 88 of the manipulation handle 76 and ends flush with the surface of said handle.

To set a new catch position of the sliding member 22, the manipulation handle 76 is pulled away from the holding device 10, and then moved in the direction of the slot 42, up to the point at which the locking pin 58 is situated above the desired recess 44 or in the vicinity thereof. If the manipulation handle 76 is then let go again, the locking pin 58 moves, under the effect of the spring 70, in the direction of the base wall 40. If the locking pin 58 is already concentric with the recess 44, then the bearing bolt 60 moves into the recess 44 and finally rests against the bearing plate 46. If, however, the locking pin 58 is not yet concentric to the recess 44, then it rests against the slot ridges of the base wall 40 and can be pushed back and forth unimpededly until it catches in the recess 44.

The sliding member 22 is designed as a locking device according to the description and the drawings of U.S. patent application No. 190,729. Additionally, there is swivelably mounted, at the bearing plate 46 on the side facing the guide section 18, a catch lever 90 around a bearing shaft 92 rigidly affixed to the bearing plate. In the locking position shown in FIG. 4, the approximately hook-shaped free end 94 of the catch lever 90 grips behind a nearly plate-shaped thickened portion 96 of the engaging member. The end 94 thereat rests against a surface 98 of the thickened portion 96, said surface being at the rear in the insertion direction A in FIG. 1. A leaf spring 100 pre-stresses the catch lever 90 into this position. This leaf spring 100 is screwed at one of its ends to a bent-out tang 102 of the bearing plate 46. When the engaging member 12 is removed, the catch lever 90 rests against a stop pin 104 projecting from the bearing plate 46, which pin holds the catch lever in the position shown in FIG. 4. If the engaging member 12 is moved into the holding device 10, then the incoming thickened portion 96 presses the rounded-off end 94 of the catch lever 90 away (in the clockwise direction in FIG. 4). As soon as the thickened portion 96 assumes the stop position in FIG. 4, the catch lever 90 swivels into the shown locking position. To unlock, an unlocking element 106 affixed at the power transmission member 16 moves into the direction opposite to the direction A, whereat, at first, the engaging member 12 remains immobile because of play. The unlocking element 106 pushes a cam 108 affixed at the catch lever 90 to the right in FIG. 4 until finally the catch lever 90 releases the thickened portion 96 of the engaging member 12. After that, the engaging member 12 is moved together with the cam 108 away from the holding device 10 by the power transmission member 16.

In order to prevent that the sliding member 22 is mistakenly pulled off of the holding track 20, there is provided at the base wall 40 of the holding track a pin-shaped stop 110.

The described positionally adjustable holding device affords a secure locking of the engaging member in the various freely selectable catch positions. The adjustment can be made simply and quickly, which serves the readiness of the vehicle user to adapt the safety belt to the respective body size.

If the holding device 10 is used in a manually operated safety belt, then the parts serving the locking are eliminated, that is to say the catch lever 90, the leaf spring 100 and the stop pin 104; in this case, the engaging member 12 is attached directly to the bearing plate 46, for example by means of welding.

We claim:

1. Holding device for adjusting the position of a fastening member (12, 14) of a safety belt along a holding track (20) in various selectable positions, comprising said holding track forms an elongated slot (42), said slot (42) having a plurality of pairs of recesses (44) spaced apart along the elongated direction of said slot (42) with the recesses in each said pair of recesses being located opposite one another, a sliding member (22) arranged to receive said fastening member (12, 14) for the safety belt supported in said holding track (20) and being displaceable along said holding track, said sliding member (22) having a bearing bolt (60) thereon extending through and axially transversely of the elongated direction of said slot (42) and being movable freely along the elongated direction of said slot, said sliding member (22) including a locking pin (58) axially alignable with said bearing bolt (60), said locking pin having a central borehole (62) in one end thereof arranged for displaceably receiving said bearing bolt (60), said locking pin (58) being selectively engageable into said pairs of recesses (44) but not being engageable within said slot (42) between said recesses, spring means (70) biasing said locking pin (58) toward said holding track (20) and said bearing bolt (60), and an actuating handle (76) attached to said locking pin for displacing said locking pin (58) against the force of said spring means (70) so that said locking pin can be released from engagement with said pairs of recesses (44).

2. Holding device according to claim 1 characterized in that said recesses 44 are formed by preferably circular arc-shaped bulges extending laterally outwardly from the sides of said slot 42 extending in the elongated direction thereof.

3. Holding device according to claim 2, characterized by a substantially U-shaped clamp 64 attached to said sliding member 22 and arranged along said slot 42 and extending through it, said locking pin 58 being mounted in the middle part of said clamp so as to be axially movable relative thereto.

4. Holding device according to claim 3, characterized in that said locking pin 58 is mounted adjacent its other end in a bearing opening 66 in the middle part of said clamp 64, said bearing bolt engaging within said central bore 62 in the one end of said locking pin 58.

5. Holding device according to one of the claims 1, 2, 3 or 4, characterized in that said engaging member 12 is attached at said sliding member 22.

6. Holding device according to claim 1, characterized in that said spring means comprises a collar 72 formed on said locking pin 58 adjacent the other end thereof, a screw-compression spring 70 which is supported at one end of said clamp 64 in the area of said bearing opening 66 therein, and at the other end against said collar 72 at the other end of said locking pin 58.

7. Holding device according to claim 1, characterized in that the one end of said locking pin 58 which projects from said bearing opening 66 of said clamp 64 is provided with said manipulation handle 76.

8. Holding device according to claim 1, characterized in that said sliding member 22 comprises a bearing plate 46 parallel to the plane of said slot 42 and a sliding-and-guidance piece 48 inserted into said slot 42.

9. Holding device according to claim 8, characterized in that said locking pin extending outwardly from one side of said holding track, and said bearing plate 46 is arranged on the other side of said holding track facing away from said safety belt, in the area of said slot 42.

10. Holding device according to claim 1, characterized in that said holding track 20 is constructed as a U-section bar.

11. Holding device according to one of the claims 8, 9 or 10, characterized in that said engaging member 12 is attached at said bearing plate 46.

12. Holding device according to claim 1, characterized in that a catch lever 90 is mounted on said sliding member 22.

13. Holding device according to claim 12, characterized in that said sliding member includes a bearing plate 46 parallel to the plane of said slot 42, and said catch lever 90 is mounted on said bearing plate 46.

14. Holding device according to claim 13, characterized in that a spring 100 is attached at said bearing 46 and thereat rests against a stop pin 104 projecting from said bearing plate 46, and said catch lever is biased into its caught position by means of said spring 100.

15. Holding device according to claim 13 or 14, including a power transmission member 16 of the safety belt, said power transmission member supports said engaging member 12 and is arranged at the side of said holding track 20 facing away from said engaging member, said bearing plate 46 is arranged between said power transmission member 16 and said holding track 20, said bearing plate 46 has a receiving slot 54 therein open at one end, said slot 42 is open at one end and said engaging member 12, in the locking position, extends through the open slot 42 of said holding track 20 as well as the open receiving slot 54 of said bearing plate 46.

16. Holding device according to claims 12, 13, 14 or 15, characterized in that an unlocking cam 108 is fixed to said catch lever 90, and an unlocking element 106 is fixed to said power transmission member 16, and engages said cam 108 for displacing said catch lever out of the caught position.

* * * * *